United States Patent
Farrugia et al.

(10) Patent No.: US 8,699,702 B2
(45) Date of Patent: Apr. 15, 2014

(54) SECURING CRYPTOGRAPHIC PROCESS KEYS USING INTERNAL STRUCTURES

(75) Inventors: Augustin J. Farrugia, Cupertino, CA (US); Benoit Chevallier-Mames, Paris (FR); Mathieu Ciet, Paris (FR)

(73) Assignee: Apple Inc., Cupertino, CA (US)

( * ) Notice: Subject to any disclaimer, the term of this patent is extended or adjusted under 35 U.S.C. 154(b) by 423 days.

(21) Appl. No.: 12/987,933

(22) Filed: Jan. 10, 2011

(65) Prior Publication Data

US 2012/0179920 A1    Jul. 12, 2012

(51) Int. Cl.
*G06F 21/00*  (2013.01)
*H04L 9/06*  (2006.01)
*H04L 9/00*  (2006.01)

(52) U.S. Cl.
CPC ............ *H04L 9/0618* (2013.01); *H04L 9/0631* (2013.01); *H04L 9/002* (2013.01)
USPC .............................................. 380/37; 380/28

(58) Field of Classification Search
None
See application file for complete search history.

(56) References Cited

U.S. PATENT DOCUMENTS

2005/0232430 A1* 10/2005 Gebotys .................. 380/286
2010/0054461 A1*  3/2010 Ciet et al. ................. 380/29

OTHER PUBLICATIONS

Michiels, "Mechanism for Software Tamper Resistance: An Application of White-Box Cryptography", 2007, pp. 1-8.*
Chow, "White-Box Cryptography and an AES Implementation", 2002, pp. 1-18.*

* cited by examiner

*Primary Examiner* — Benjamin Lanier
(74) *Attorney, Agent, or Firm* — Adeli LLP

(57) ABSTRACT

In the field of cryptography, such as for a computer enabled block cipher, a cipher or other cryptographic process is hardened against an attack by protecting the cipher key or subkeys by using a masking process for these keys. The subkeys are thereby protected by applying to them a mask or set of masks to hide their contents. This is especially advantageous in a "White Box" computing environment where an attacker has full access to the cipher algorithm, including the algorithm's internal state during execution. Further, this method and the associated apparatus are useful where the key is derived through a process and so is unknown when the software code embodying the cipher is compiled. This is typically the case where there are many users of the cipher and each has his own key or where each user session has its own key.

38 Claims, 3 Drawing Sheets

SECURING CRYPTOGRAPHIC PROCESS KEYS USING INTERNAL STRUCTURES

FIELD OF THE INVENTION

This invention relates to data security and cryptography and more generally to improving the security of computer enabled cryptographic processes.

BACKGROUND

In the field of data security, there is a need for fast and secure encryption. This is why the AES (Advanced Encryption Standard) cipher has been designed and standardized. Cryptographic algorithms are widely used for encryption and decryption of messages, authentication, digital signatures and identification. AES is a well known symmetric block cipher. Block ciphers operate on blocks of plaintext and ciphertext, usually of 64 or 128 bits length but sometimes longer. Stream ciphers are the other main type of cipher and operate on streams of plain text and cipher text 1 bit or byte (sometimes one word) at a time. With a block cipher, a particular plain text block will always be encrypted to the same cipher text block using the same key. However, to the contrary with a stream cipher, the same plain text bit or byte will be encrypted to a different bit or byte each time it is encrypted. Hence in the ECB (electronic code book) mode for block ciphers, each plain text block is encrypted independently. In other modes, encryption is a function of the previous blocks.

AES is approved as an encryption standard by the U.S. Government. Unlike its predecessor DES (Data Encryption Standard), it is a substitution permutation network (SPN). AES is fast to execute in both computer software and hardware implementation, relatively easy to implement, and requires little memory. AES has a fixed block size of 128 bits and a key size of 128, 192 or 256 bits. Due to the fixed block size of 128 bits, AES operates on a 4×4 array of bytes. It uses key expansion and like most block ciphers a set of encryption and decryption rounds (iterations). Each round involves the same processes. Use of multiple rounds enhances security. Block ciphers of this type use in each round a substitution box (s-box). This operation provides non-linearity in the cipher and significantly enhances security.

Note that these block ciphers are symmetric ciphers, meaning the same algorithm and key are used for encryption and decryption, except usually for minor differences in the key schedule. As is typical in most modern ciphers, security rests with the (secret) key rather than the algorithm. The s-boxes or substitution boxes accept an n bit input and provide an m bit output. The values of m and n vary with the cipher and the s-box itself. The input bits specify an entry in the s-box in a particular manner well known in the field.

Many encryption algorithms are primarily concerned with producing encrypted data that is resistant to decoding by an attacker who can interact with the encryption algorithm only as a "Black Box" (input-output) model, and cannot observe internal workings of the algorithm or memory contents, etc due to lack of system access. The Black Box model is appropriate for applications where trusted parties control the computing systems for both encoding and decoding ciphered materials.

However, many applications of encryption do not allow for the assumption that an attacker cannot access internal workings of the algorithm. For example, encrypted digital media often needs to be decrypted on computing systems that are completely controlled by an adversary (attacker). There are many degrees to which the Black Box model can be relaxed.

An extreme relaxation is called the "White Box" model. In a White Box model, it is presumed that an attacker has total access to the system performing an encryption, including being able to observe directly a state of memory, program execution, modifying an execution, etc. In such a model, an encryption key can be observed in or extracted from memory, and so ways to conceal operations indicative of a secret key are important.

Software implementations of cryptographic building blocks are insecure in the White Box threat model where the attacker controls the execution process. The attacker can easily lift the secret key from memory by just observing the operations acting on the secret key. For example, the attacker can learn the secret key of an AES software implementation by observing the execution of the Key Schedule algorithm.

Hence there are two basic principles in the implementation of secure computer applications (software). The Black Box model implicitly supposes that the user does not have access to the computer code nor any cryptographic keys themselves. The computer code security is based on the tampering resistance over which the application is running, as this is typically the case with SmartCards. For the White Box model, it is assumed the (hostile) user has partially or fully access to the implemented code algorithms; including the cryptographic keys themselves. It is assumed the user can also become an attacker and can try to modify or duplicate the code since he has full access to it in a binary (object code) form. The White Box implementations are widely used (in particular) in content protection applications to protect e.g. audio and video content.

Software implementation of cryptographic building blocks are insecure in the White Box threat model where the attacker controls the computer execution process. The attacker can easily extract the (secret) key from the memory by just observing the operations acting on the secret key. For instance, the attacker can learn the secret key of an AES cipher software implementation by passively monitoring the execution of the key schedule algorithm. Also, the attacker could be able to retrieve partial cryptographic result and use it in another context (using in a standalone code, or injecting it in another program, as an example).

Content protection applications are one instance where it is desired to keep the attacker from finding the secret key even though the attacker has complete control of the execution process. The publication "White-Box Cryptography in an AES implementation" Lecture Notes in Computer Science Vol. 2595, Revised Papers from the 9th Annual International Workshop on Selected Areas in Cryptography pp. 250-270 (2002) by Chow et al. discloses implementations of AES that obscure the operations performed during AES by using table lookups (also referred to as TLUs) to obscure the secret key within the table lookups, and obscure intermediate state information that would otherwise be available in arithmetic implementations of AES. In the computer field, a table lookup table is an operation using a data structure (the table) to replace a computation with an array indexing operation.

Chow et al. (for his White Box implementation where the key is known at the computer code compilation time) uses 160 separate tables to implement the 11 AddRoundKey operations and 10 SubByte Operations (10 rounds, with 16 tables per round, where each table is for 1 byte of the 16 byte long—128 bit—AES block). These 160 tables embed a particular AES key, such that output from lookups involving these tables embeds data that would normally result from the AddRoundKey and SubByte operations of the AES algorithm, except that this data includes input/output permutations that make it more difficult to determine what parts of these tables represent round key information derived from the AES key. Chow et al. provide a construction of the AES algorithm for such White Box model. The security of this construction resides in the use of table lookups and masked data. The input and output mask applied to this data is never removed along the process. In this solution, there is a need for knowing the key value at the compilation time, or at least to be able to derive the tables from the original key in a secure environment.

The conventional implementation of a block cipher in the White Box model is carried out by creating a set of table lookups. Given a dedicated cipher key, the goal is to store in a table the results for all the possible input messages. This principle is applied for each basic operation of the block cipher. In the case of the AES cipher, these are the shiftRow, the add RoundKey, the subByte and the mixColumns operations.

However, Chow et al. do not solve all the security needs for block cipher encryption in a White Box environment. Indeed, the case where the cipher key is derived through a given process and so is unknown at the code compilation time is not included in Chow et al.

SUMMARY

A typical situation not addressed by Chow et al. is when a software based cryptographic process is distributed over several users and each user has his own cipher key. It is then, from a practical point of view, impossible to disseminate different software code to each user. Another situation is when generating session keys (which by definition are different for each user session) through a given process. Of course, in this case the key is unknown at the software code compilation time. A last case is when it is necessary to store a very large number of keys. It is not reasonable to consider storing about 700 kB of data for each such key.

This disclosure addresses these problems with a powerful, efficient and new solution to harden the extraction of an AES (or other cryptographic) key in a White Box environment by masking the keys or subkeys. Further, the present method may be used in a more general case of other cryptographic processes. The present disclosure therefore is directed to hiding the key in a better way. The present method is a powerful, efficient solution to protection of a cryptographic key in a White Box environment. This includes the situation where the key is not always the same, which is believed to be new, and which is important in real world situations.

The present system and method address those cases when the cipher key is unknown at the software code compilation time or when the code size is limited, and there is a need to harden "dynamically" the process and hide the key to protect against an attacker. This aspect of the present disclosure can be combined with prior existing solutions. The most simple and known existing solution to combine it with is data transforms on the cipher key, which are done to avoid visible removable during the execution of the cryptographic process.

DETAILED DESCRIPTION

AES Description

Figure 1:
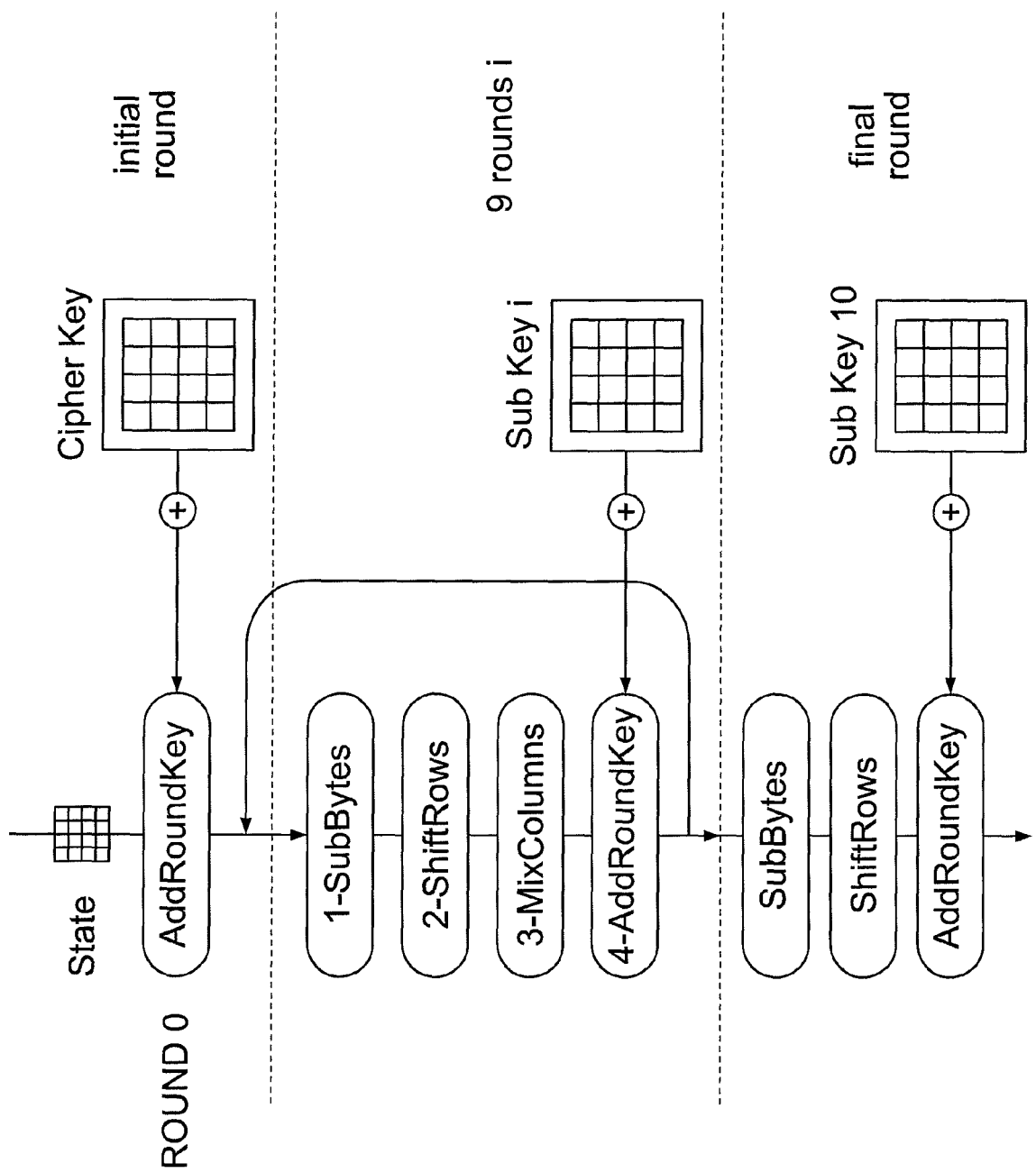
FIG. 1 shows in the prior art AES encryption.

See the NIST AES standard for a more detailed description of the AES cipher (Specification for the ADVANCED ENCRYPTION STANDARD (AES), NIST, which can be found in the Internet). The following is a summary of the well known AES cipher. The AES cipher uses a 16 byte cipher long key, and has 10 rounds (final plus 9 others). The entire AES algorithm has the following operations as depicted graphically in FIG. 1 and showing round zero of the 9 rounds:

11 AddRoundKey Operations
10 SubByte Operations
10 ShiftRow Operations
9 MixColumn Operations AES is computed using a 16-byte buffer (computer memory) referred to as the AES "state" in this disclosure and shown in prior art FIG. 1.

To summarize how these operations operate on the state,
  (i) AddRoundKeys (ARK) are a logical XOR (Boolean exclusive OR operation) with some subkey bytes.
  (ii) ShiftRows (SR) are a move from one byte location to another.
  (iii) MixColumns (MC) are a linear table-look up (TLU).
  (iv) SubBytes (SB) are a non-linear TLU.

Preliminarily to the decryption itself, in the initial round in FIG. 1, the original 16-byte cipher key is expanded to 11 subkeys designated K0, . . . , K10, so there is a subkey for each round during what is called the key-schedule. Each subkey, like the original key, is 16-byte long.

The following explains the AES encryption process round by round. For the corresponding decryption process, one performs the inverse of each operation, in the inverse order. The inverse operation of ARK is ARK itself, the inverse operation of SB is the inverse subbyte (ISB) which is basically another TLU, the inverse operation of MC is the inverse mix column (IMC) which is basically another TLU, and the inverse operation of SR is the inverse shift row (ISR) which is another move from one byte location to another.

Expressed schematically, the AES decryption process is as follows:
ARK (K10)
ISR
ISB
ARK (K9)
IMC
ISR
ISB
ARK (K8)
IMC
ISR
ISB
ARK (K7)
IMC
ISR
ISB
ARK (K6)
IMC
ISR
ISB
ARK (K5)
IMC
ISR
ISB ARK (K4)
IMC
ISR
ISB
ARK (K3)
IMC
ISR
ISB
ARK (K2)
IMC
ISR
ISB
ARK (K1)
IMC
ISR
ISB
ARK (K0)

Without lack of generality, the description below of the present method is for the case of decryption, but it is evident that the method in accordance with the invention can be used also for encryption or other cryptographic processes. The method in accordance with the invention also can easily be applied to other variants of AES with more rounds (the 192 and 256-bit key length versions) as well as to other block ciphers and more generally to non-block ciphers and other key based cryptographic processes.

Present Method

The AES cipher as described above uses 11 sub-keys numbered 0 to 10. In the White Box environment described here, it is not practical to store all the table look-ups as in the case of a fixed White Box implementation (see Chow et. al.). In accordance with the invention, the key instead is stored in a complex way to include masks applied to it. In this technical field, a mask is a digital set of bits logically or mathematically combined with another value so as to alter the another value in a systematic fashion, thereby providing security. More generally, the complex way is an invertible operation such as a permutation. Invertible means that given some information, the original value can be recovered.

The key is stored in a generic memory array called here a "blob". "Blob" in the field generally refers to a collection of binary bits.

In the AES cipher for most implementations, most of the operations, except the add round key operation, are carried out through table look-ups. In this disclosure "a-bit*b-bit table" refers to an array of $2^a$ entries, where each entry is b-bits long. So, the 8-bit*8-bit tables each have size 256 bytes, whereas the 8-bit*32-bit tables each have size 1 Kbyte long.

ISB operations are conventionally performed as:
compute value u=IS[x], where IS is an 8-bit*8-bit table, and where x is a byte of the AES state.

Then the ISB operation is conventionally followed by the ARK operation so:
compute value v=u XOR k, where k is a selected byte of the subkey.

A principle described here is how to hide the subkey byte k. Instead of using directly operation IS and subkey k, the present method is as follows:
generate a mask k' (these masks are each a random or pseudo-random number) store in memory a table designated ISN [x]=IS[x] XOR k', which is a 256-byte array.
replace the subkey byte k in the key blob by computing:

k''=k XOR k'

Then the ISB and the ARK operations are performed as:
compute u=ISN[x]
compute v=u XOR k''

Doing this "hides" a part of the subkey (round key) in the table defining operation ISN, making an attack more complicated. To simplify the above explanation, it is in terms of only one subkey byte k and one mask k'. In more complex embodiments, the mask protection is applied to several or all of the subkey bytes, using one or several masks k'. (A subkey is typically more than one byte in length. Indeed, in the AES cipher a subkey is always 16-byte long.) The goal is to introduce a link between the software code embodying the cipher code and the tables generated stored in the key blob. Then re-construction by an attacker of the original key requires reverse engineering of the code and understanding and use of the generated blob.

Second Embodiment—Dynamic/Static masks

Practically, for each new mask k' the code to carry out the cryptographic process requires another table for look-ups. So this gives more protection, but also requires more memory, which is a tradeoff.

Another tradeoff is available: making the masks dynamic, i.e., dependent on the key (i.e., the masks change for each key) and/or on the decryption execution (i.e., change the mask each time one decrypts a new ciphertext block or encrypts a new plaintext block). Other masks may be static in the code, i.e., are hardcoded.

Static (constant or hardcoded) tables are advantageous for the following reasons:
corresponding ISN tables are computed securely during the code compilation time, so there is better hiding of the masks and keys
the tables can be stored in ROM (Read Only Memory), instead of RAM (Random Access Memory), where ROM is inherently more secure and may be less expensive.

Dynamic tables have the security advantage that they change, so they make the attacker's work and comprehension much more complicated.

In another embodiment, static and dynamic tables are both used—some of the tables being of each type.

Assume there are u1 dynamic key tables, u2 dynamic execution tables, and u3 constant tables. This method requires in terms of storage:
u2 256-byte dynamic tables stored in RAM (since they are computed at execution time)
u3 256-byte static constant tables which are hardcoded in the code (since they are computed at compilation time)

For the dynamic key tables, it is the software developer's choice: either these tables are stored in the key blob (making the key blob larger by a factor of u1 256-byte tables), or these tables are computed at execution time (as the u2 tables), or a combination of the two solutions.

Third Embodiment—The Aes State is Masked

Consider cases where the data being processed (ciphertext or plaintext—the message) are masked, i.e., the message x is not in clear, but with a known mask designated m_x applied. Then, to share a table IS between rounds and bytes of the state, the corresponding mask m_x should be the same.

In the worst case where every mask is different and one protects all data by the method, this requires 16 tables per round, so 160 tables in total, which is 40 Kbytes of memory. A more practical variation protects fewer bytes per round (e.g., protects between 4 and 8 bytes), and/or makes some of the masks equal (e.g., by groups of 4). For example, if one protects 6 bytes per round and groups the masks into groups of 4, one needs only 15 tables, which is less than 4 Kbytes of memory.

The following is a protection analysis of this method. The tables stored in the code (those designated as u3) are present only to make the process more complex and make an attack harder. But with a legacy version of AES (i.e., certain keys are known to the attacker), an attacker may try to learn the corresponding masks k', and reapply his preceding attacks.

On the contrary, the tables stored in the key blob or those computed at execution time as explained above (corresponding to u1 and u2) are more powerful: even using the legacy attack, the attacker has no power against these tables, since they are linked to the key. So, recovering k' for a previously broken key does not help the attacker recover a new key.

Fourth Embodiment—Using u2 Tables

Another improvement is to provide a large number of tables in the code (e.g., hundreds of tables), and to use only a few tables for each key. Indexes define which table is used with which key. The keys are identified by keeping these indexes in the key blob. Thus, it would be necessary to break many of the keys to know each and every mask k'. A disadvantage of this embodiment is that the hundreds of tables would require dozens of Kbytes of memory to store the tables.

Fifth Embodiment—Splitting of the Ark in the Isb

A further variant is when, contrary to the previous embodiment, an ARK operation is followed by an ISB operation (the previous embodiment was when an ISB is followed by an ARK) This is typically the case for the protection of K10 (the first AES subkey that is used during decryption), which was not possible with the previous embodiment.

Normally, one would:
compute u=x XOR k, where k is a selected subkey byte, and x is a selected state byte
compute v=IS[u], where IS is an 8-bit*8-bit table
Instead of directly using IS and k, here one does as follows:
generate masks k' (these masks are random numbers) store in memory ISO [x]=IS[x XOR k'], which is a 256-byte array.
replace the subkey byte k in the key blob by k"=k XOR k'
Then the ISB and the ARK operations are performed as:
compute u=x XOR k"
compute v=ISO[u]

This embodiment is applicable to the K10 subkey. But it may be possible to apply it to other subkeys if one inverts the order of AES operations (and so changes the subkeys). As above, one may use dynamic and/or static tables.

Figure 2:
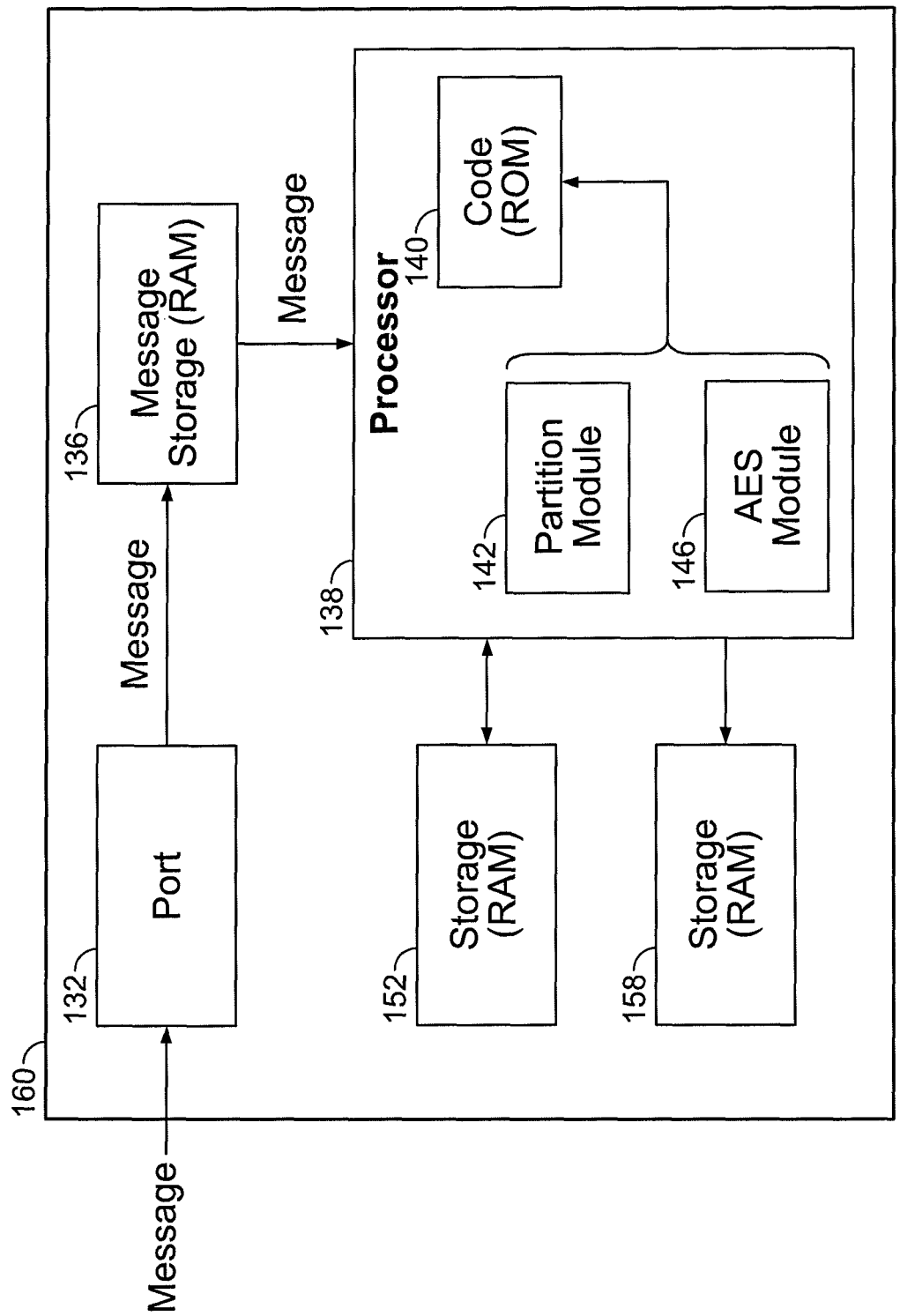
FIG. 2 shows a computing system in accordance with the invention.

FIG. 2 shows in a block diagram relevant portions of a computing device (system) 160 in accordance with the invention which carries out the cryptographic process as described above. This is, e.g., a server platform, computer, mobile telephone, personal digital assistant or similar device, or part of such a device and includes conventional hardware components executing in one embodiment software (computer code) which carries out the above examples. This code may be, e.g., in the C or C++ computer language or its functionality may be expressed in the form of firmware or hardware logic; writing such code or designing such logic would be routine in light of the above examples and logical expressions. Of course, the above examples are not limiting. Only relevant portions of this apparatus are shown for simplicity. Essentially a similar apparatus encrypts the message, and may indeed be part of the same platform.

The computer code is conventionally stored in code memory (computer readable storage medium) 140 (as object code or source code) associated with conventional processor 138 for execution by processor 138. The incoming ciphertext (or plaintext) message (in digital form) is received at port 132 and stored in computer readable storage (memory 136 where it is coupled to processor 138. Processor 138 conventionally then partitions the message into suitable sized blocks at partitioning module 142. Another software (code) module in processor 138 is the decryption module 146 which carries out the key masking and decryption (or encryption) functions set forth above, with its associated computer readable storage (memory) 152.

Also coupled to processor 138 is a computer readable storage (memory) 158 for the resulting decrypted plaintext message. Storage locations 136, 140, 152, 158 may be in one or several conventional physical memory devices (such as semiconductor RAM or its variants or a hard disk drive). Electric signals conventionally are carried between the various elements of FIG. 2. Not shown in FIG. 2 is any subsequent conventional use of the resulting plaintext or ciphertext stored in storage 145.

Figure 3:
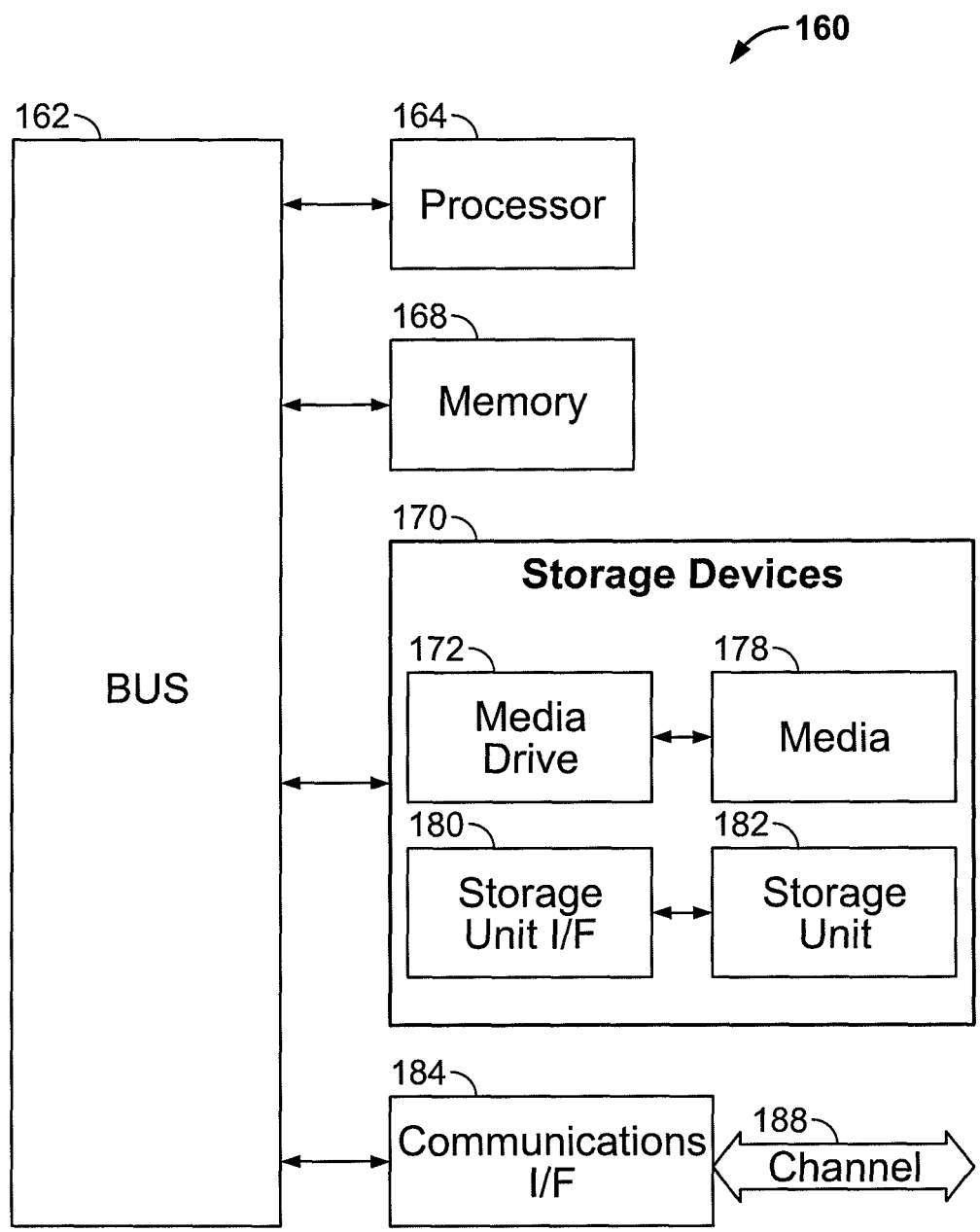
FIG. 3 shows a computing system as known in the art and used in accordance with the invention.

FIG. 3 illustrates detail of a typical and conventional embodiment of computing system 160 that may be employed to implement processing functionality in embodiments of the invention as indicated in FIG. 2 and includes corresponding elements. Computing systems of this type may be used in a computer server or user (client) computer or other computing device, for example. Those skilled in the relevant art will also recognize how to implement embodiments of the invention using other computer systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor 164 (equivalent to processor 138 in FIG. 2). Processor 164 can be implemented using a general or special purpose processing engine such as, for example, a microprocessor, microcontroller or other control logic. In this example, processor 164 is connected to a bus 162 or other communications medium.

Computing system 160 can also include a main memory 168 (equivalent of memories 136, 140, 152, and 158), such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 172 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable medium that is read by and written to by media drive 72. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184 (equivalent to part 132 in FIG. 2). Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 160 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A method of performing a cryptographic process in a content protection application, the cryptographic process having a plurality of cryptographic operations, the content protection application executed by at least one processing unit of an electronic device, the method comprising:
   receiving a portion of a message and a key for use in the cryptographic process;
   generating a mask value for the key;
   masking the key by calculating a logical combination of the key with the mask value to generate a masked key;
   applying a first cryptographic operation to the message portion to generate an initial cryptographic result;
   applying a first table operation by logically combining the initial cryptographic result with the mask value to generate a masked cryptographic result; and
   applying a second table operation by logically combining the masked cryptographic result with the masked key to cryptographically protect the message portion.

2. The method of claim 1, wherein the message portion is one of audio and video content, and the cryptographic process is respectively one of encryption and decryption.

3. The method of claim 1, wherein the first table operation is a non-linear table operation.

4. The method of claim 3, wherein the first table operation defines a subbyte operation.

5. The method of claim 1, wherein the second table operation defines an add round key operation.

6. The method of claim 1, wherein the cryptographic process includes a plurality of rounds, each round having an associated subkey, and wherein the received key is a subkey of a first round of the plurality of rounds.

7. The method of claim 6, wherein the received key is a selected portion of the subkey.

8. The method of claim 7, further comprising repeating the masking for a second selected portion of the subkey.

9. The method of claim 1, wherein the cryptographic process is one of encryption and decryption using a block cipher.

10. The method of claim 6, wherein each round includes applying a predetermined set of cryptographic operations, each cryptographic operation being one of an exclusive OR, a byte move, and a table lookup.

11. The method of claim 6, further comprising generating the subkeys from a cipher key.

12. The method of claim 1, wherein generating the mask value comprises generating random numbers or pseudo-random numbers.

13. The method of claim 1, wherein generating the mask value comprises generating the mask value as a function of one of the key and the message portion.

14. The method of claim 1, wherein the first cryptographic operation is applied to only a selected portion of the message portion.

15. The method of claim 14, wherein the first cryptographic operation is applied to a plurality of selected portions of the message portion.

16. An electronic system comprising:
   a set of processing units for executing sets of instructions;
   a non-transitory machine readable medium storing a content protection application which when executed by at least one processing unit performs a cryptographic process to protect content, the cryptographic process having a plurality of cryptographic operations, the content protection application comprising sets of instructions for:
      receiving a portion of a message and a key for use in the cryptographic process;
      generating a mask value for the key;
      masking the key by calculating a logical combination of the key with the mask value to generate a masked key;
      applying a first cryptographic operation to the message portion to generate an initial cryptographic result;
      applying a first table operation by logically combining the initial cryptographic result with the mask value to generate a masked cryptographic result; and
      applying a second table operation by logically combining the masked cryptographic result with the masked key to cryptographically protect the message portion.

17. The electronic system of claim 16, wherein the message portion is one of plaintext and ciphertext, and the cryptographic process is respectively one of encryption and decryption.

18. The electronic system of claim 16, wherein the first table operation is a non-linear table operation.

19. The electronic system of claim 18, wherein the first table operation defines a subbyte operation.

20. The electronic system of claim 16, wherein the second table operation defines an add round key operation.

21. The electronic system of claim 16, wherein the cryptographic process includes a plurality of rounds, each cryptographic operation being one of an exclusive OR, a byte move, and a table lookup.

22. The electronic system of claim 21, wherein the received key is a selected portion of a subkey.

23. The electronic system of claim 22, wherein the content protection application further comprises a set of instructions for masking a second selected portion of the subkey.

24. The electronic system of claim 16, wherein the cryptographic process is one of encryption and decryption using a block cipher.

25. The electronic system of claim 21, wherein each round includes applying a predetermined set of cryptographic operations, each cryptographic operation being one of an exclusive OR, a byte move, and a table lookup.

26. The electronic system of claim 21, wherein the content protection application further comprises a set of instructions for generating subkeys from a cipher key.

27. The electronic system of claim 16, wherein the set of instructions for generating the mask value generates a random or a pseudo-random number.

28. The electronic system of claim 16, wherein the set of instructions for generating the mask value generates the mask as a function of one of the key and the message portion.

29. The electronic system of claim 16, wherein the set of instructions for applying the first cryptographic operation to the message portion applies the first cryptographic operation to only a selected portion of the message portion.

30. The electronic system of claim 29, wherein the set of instructions for applying the first cryptographic operation to the message portion applies the first cryptographic operation to a plurality of selected portions of the message portion.

31. A non-transitory machine readable medium storing a content protection application which when executed by at least one processing unit of an electronic device performs a cryptographic process to protect content, the cryptographic process having a plurality of cryptographic operations, the content protection application comprising sets of instructions for:

receiving a portion of a message and a key for use in the cryptographic process;

generating a mask value for the key;

masking the key by calculating a logical combination of the key with the mask value to generate a masked key;

applying a first cryptographic operation to the message portion to generate an initial cryptographic result;

applying a first table operation by logically combining the cryptographic result with the mask value to generate a masked cryptographic result; and applying a second table operation by logically combining the masked cryptographic result with the masked key to cryptographically protect the message portion.

32. The non-transitory machine readable medium of claim 31, wherein the message portion is one of plaintext and ciphertext, and the cryptographic process is respectively one of encryption and decryption.

33. The non-transitory machine readable medium of claim 31, wherein the first table operation is non-linear and defines a subbyte operation.

34. The non-transitory machine readable medium of claim 31, wherein the second table operation defines an add round key operation.

35. The non-transitory machine readable medium of claim 31, wherein the cryptographic process includes a plurality of rounds, each cryptographic operation being one of an exclusive OR, a byte move, and a table lookup.

36. The non-transitory machine readable medium of claim 31, wherein the cryptographic process is one of encryption and decryption using a block cipher.

37. The non-transitory machine readable medium of claim 31, wherein the set of instructions for generating the mask value generates a random or a pseudo-random number.

38. The non-transitory machine readable medium of claim 31, wherein the set of instructions for generating the mask value generates the mask as a function of one of the key and the message portion.

* * * * *